United States Patent [19]

Saffer et al.

[11] Patent Number: 4,844,475

[45] Date of Patent: Jul. 4, 1989

[54] ELECTRONIC INTERACTIVE GAME APPARATUS IN WHICH AN ELECTRONIC STATION RESPONDS TO PLAY OF A HUMAN

[75] Inventors: Gary M. Saffer, Ranchos Palos Verdes; Wayne R. Halford, Manhattan Beach; Jay M. Bro, Long Beach; Peter C. Hill, Torrance; Shahram Naghshineh, Los Angeles; Janice E. Rosenthal, Manhattan Beach; Scott T. Boden, El Cajon, all of Calif.; Peter A. Lam, Yaumati, Hong Kong; Paul A. Williams, Mesa, Ariz.

[73] Assignee: Mattel, Inc., Hawthorne, Calif.

[21] Appl. No.: 274

[22] Filed: Dec. 30, 1986

[51] Int. Cl.⁴ ............................................. A63F 9/22
[52] U.S. Cl. .................................... 273/311; 273/1 E; 273/DIG. 28; 434/20; 340/720; 340/706
[58] Field of Search ................. 273/1 E, 1 GC, 85 G, 273/138 A, DIG. 28, 311, 310, 312-314; 350/264; 250/203 R, 216; 434/21, 20, 22; 340/720, 706

[56]  References Cited

U.S. PATENT DOCUMENTS

| | | | |
|---|---|---|---|
| 2,957,693 | 10/1960 | Ross | 273/374 |
| 4,123,164 | 10/1978 | Tambor | 250/203 R |
| 4,306,769 | 12/1981 | Martinet | 350/264 |
| 4,533,144 | 5/1985 | Juarez et al. | 434/21 |
| 4,602,907 | 7/1986 | Foster | 273/DIG. 28 |
| 4,654,700 | 3/1987 | Baer | 273/DIG. 28 |
| 4,695,953 | 9/1987 | Blair et al. | 273/85 G |
| 4,729,563 | 3/1988 | Yokoi | 273/DIG. 28 |

Primary Examiner—Maryann Lastova
Attorney, Agent, or Firm—Ronald W. Reagin; Stephen L. King

[57]  ABSTRACT

Interactive game apparatus is disclosed which includes one or more photosensitive weapon devices which can interact with a coded video display and with each other to provide two-way interaction, where each weapon may score against an opponent and may be hit by an opponent. Accessory devices in the form of a photosensitive light source and a rotating mirror act to increase the excitement of the game play.

19 Claims, 11 Drawing Sheets

ELECTRONIC INTERACTIVE GAME APPARATUS IN WHICH AN ELECTRONIC STATION RESPONDS TO PLAY OF A HUMAN

BACKGROUND OF THE INVENTION

This invention relates to interactive games and, more particularly, to game apparatus which enables a player to interact with images on a video screen, to interact with another player, or to interact with other game elements to permit solo play without the need for video images.

Over the years, many types of interactive video games have been designed One type of such game employs a photo responsive device, usually shaped as a weapon such as a gun. The object of the game is generally to point and "shoot" at various targets displayed on the video screen. The photo responsive portion of the weapon is designed to detect these targets by responding to various light modulation techniques used in the display of the target.

Some of the apparatus described above are disclosed in U.S. Pat. No. 3,599,221 issued Aug. 10, 1971 to R. Baer; U.S. Pat. No. 3,728,480 issued Apr. 17, 1973 to R. Baer; U.S. Pat. No. 3,993,861, issued Nov. 23, 1976 to R. Baer; U.S. Pat. No. 4,496,158, issued Jan. 29, 1985 to R. Baer; U.S. Pat. No. 4,395,045, issued July 26, 1983 to R. Baer; and U.S. Pat. No. 4,608,601, issued Aug. 26, 1986 to P. Shreck, et al.

In addition to the above, several patents disclose photosensitive devices for use in target games. Among these patents are U.S. Pat. No. 4,054,290, issued Oct. 18, 1977 to A. Villa; U.S. Pat. No. 4,171,811, issued Oct. 23, 1979 to B. Meyer, et al; and U.S. Pat. No. 4,533,144, issued Aug. 6, 1985 to M. Juarez, et al.

One of the shortcomings of these prior art devices is that they do not provide for two-way interaction with the displayed video images. For example, in a marksman type game it is highly desirable for the video images to represent not just a moving target to be "shot" at by the player, but these images should also be capable of "shooting back" at the player to increase the realism of the game play. Generally, the prior art games use the video display only as a target.

Another shortcoming of prior art interactive video games is that the game components cannot be used for game play in the absence of the video display. Hence, if a television set is not available, the game cannot be played. Further, such prior art games generally do not permit multiple players to interact directly with each other. They can only interact with the video display images Accordingly, it is an object of the present invention to provide new and improved interactive game apparatus.

It is another object of the present invention to provide an interactive video marksman game in which the video images act as targets as well as marksman.

It is yet another object of the present invention to provide interactive game apparatus suitable for game play with or without a video display.

SUMMARY OF THE INVENTION

The foregoing and other objects of the invention are accomplished by interactive game apparatus which includes a photosensitive device in the form of a weapon having a photosensitive area which may be aimed by a player at a light source. A detector is provided for detecting light rays transmitted in the form of a burst of first coded light signals and for providing a first detector signal when the first coded light signals impinge on the photosensitive area. The detector also detects light rays transmitted in the form of a burst of second coded light signals and provides a second detector signal when the second coded light signals impinge on the photosensitive area. A trigger is included which is actuated by the player to provide a trigger signal.

Player signal electronics provides a player signal discernable by the player when the second detector signal is provided. Control circuitry is provided which is responsive to the detector, the trigger signal and the player signal. The circuitry includes a timer for determining the time interval between the occurrence of the player signal and the trigger signal.

A counter counts each occurrence of the first detector signal (representing being "hit" by an opponent) and also counts each occurrence of the second detector signal (representing a "score" against the opponent) for those occurrences where the interval of time between the player signal and the trigger signal is within a predetermined interval of time.

A light source is included in the device and provides the burst of first coded light signals upon actuation of the trigger.

The weapon can be used in conjunction with video images encoded to provide the coded light signals. The weapon may also be used in conjunction with a second similarly constructed weapon operated by a second player.

Other objects, features and advantages of the invention will become apparent from a reading of the specification taken in conjunction with the drawings in which like reference designators refer to like elements throughout the several views.

DESCRIPTION OF THE PREFERRED EMBODIMENT

Figure 1:
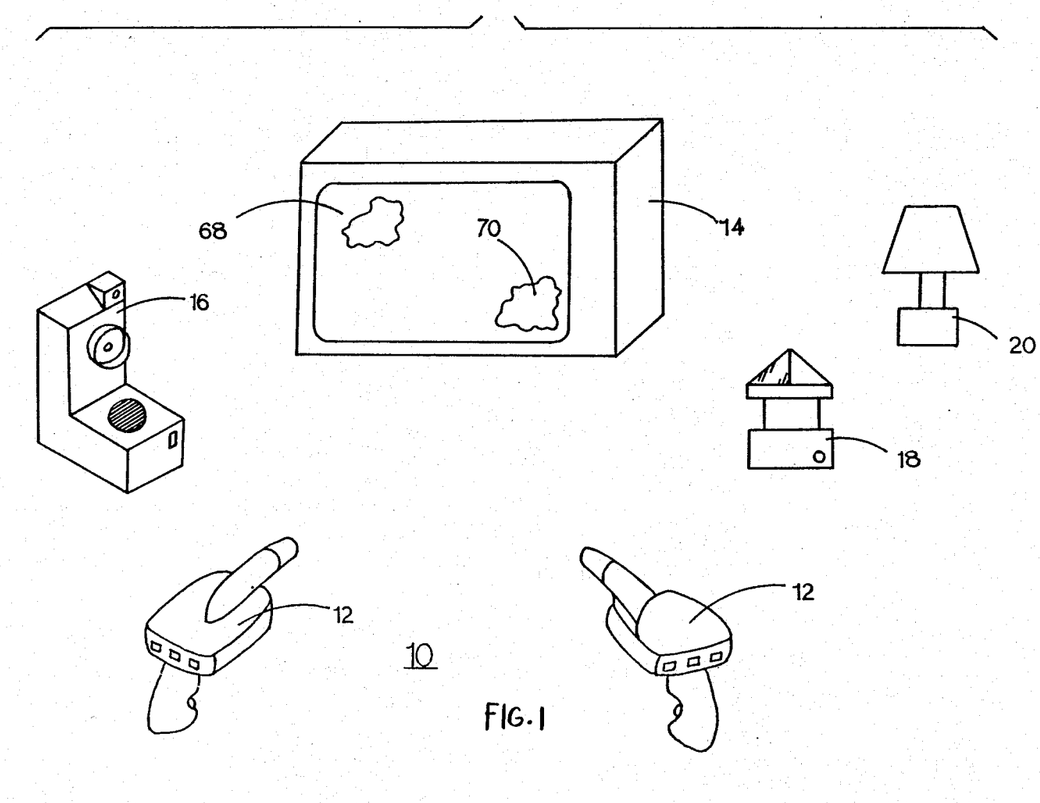
FIG. 1 is perspective view showing the various elements of the interactive game apparatus of the present invention.

Referring to FIG. 1, there is shown a perspective view of the various elements of the interactive game apparatus 10 of the present invention. The elements include photosensitive weapons 12 which are battery operated handheld devices used by the game players in conjunction with a video display such as a TV set 14 or which may be used in conjunction with each other as more fully described below.

Additional elements of the game apparatus 10 include a photosensitive light source 16 and a rotating mirror 18 which is used in conjunction with a conventional light source such as a table lamp 20.

Figure 2:
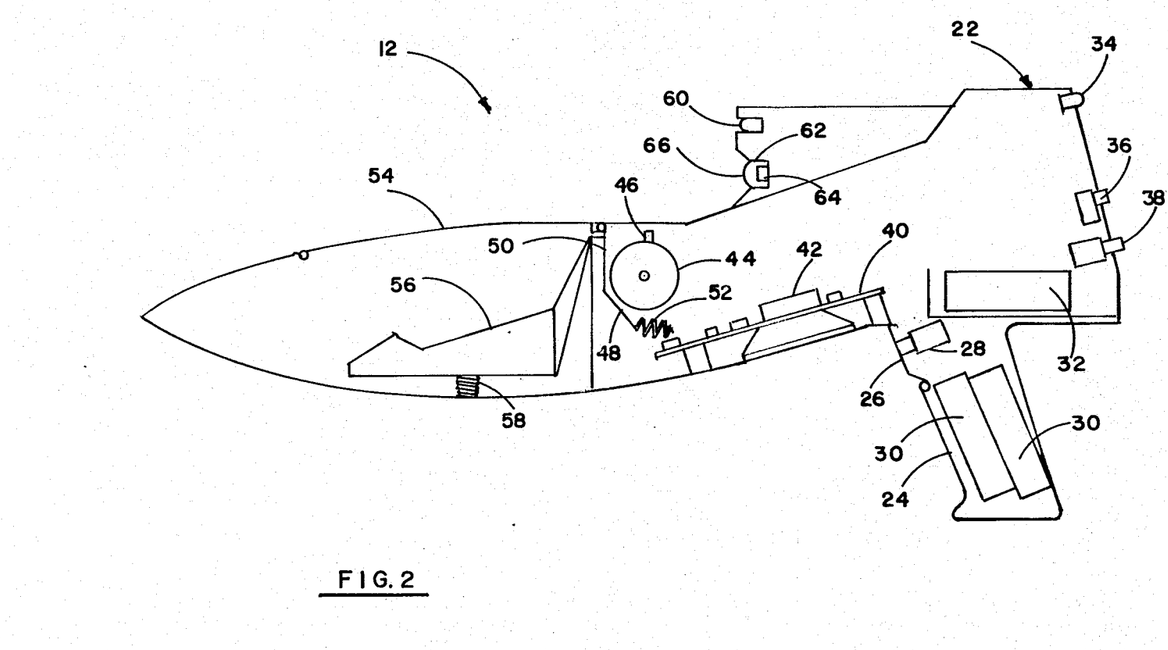
FIG. 2 is a cutaway view of a weapon which is one of the interactive game elements shown in FIG. 1.

FIG. 2 is a cutaway view of the weapon 12 showing the location of the various internal components. The weapon 12 is formed of a plastic housing 22 which may be molded in the shape of a space vehicle or other attractive shape, and includes a hand grip 24 supporting a trigger 26.

Depressing the trigger 26 actuates a switch 28 to produce a trigger signal as described below. The hollow handgrip 24 also serves as a battery compartment to house batteries 30 which are used to supply power to some of the high power consumption output devices provided as part of the weapon 12. Above the handgrip 24 is a second battery compartment housing another battery 32 used to provide power to the various electronic circuits within the weapon 12.

Mounted along the rear surface of the weapon 12 is a visible LED 34 which is used to inform the player when the weapon is in a position to score a point against an opponent. Below the LED 34 is mounted a power switch 36 used to energize the weapon 12 and to select one of two operating modes. These modes include a TV mode where the opponent appears as part of the video display on the television 14, and a combat mode where the opponent is a second player who also has a weapon 12.

Mounted below the switch 36 is a count switch 38. When this switch is pressed, the LED 34 displays the player's score by flashing once for each score point. Mounted along the bottom of the weapon 2 is a printed circuit board 40 which is used to hold the various electronic components of the weapon 12 and also mounts a speaker 42 used to provide a variety of audible signals, including the player's score, to the player during the play of the game.

Toward the center of the weapon 12 is mounted a motor 44. Attached to the shaft of the motor 44 is a cam having a projection 46 thereon. Adjacent the motor 44 is a lever 48 which pivots about a hinge point 50 and is biased into position by a spring 52. A projection on the upper end of the lever 48 is used to hold in place a hinged canopy 54 and an ejection seat 56. The seat 56 is biased upward by the spring 58.

In the play of the game 10, a player may insert one of a number of small figures into the ejection seat 56 by opening the canopy 54. When the motor 44 is energized, the projection 46 rotates into contact with the lever 48 causing it to release the canopy 54 and the seat 56. The spring 58 then causes the seat 56 and the figure sitting thereon to be ejected from the weapon 12.

Mounted atop the weapon 12 is an incandescent light bulb 60 designed to project a beam of light outward toward the front of the weapon 12. A photosensor assembly 62 is also mounted atop the weapon 12 and is used to house a photosensor 64 which may be, for example, a cadmium sulfide cell or a silicon photodiode. The photosensor 64 is covered by a diffuser 66 described in more detail below. The photosensor 64 is used to detect light rays transmitted toward the weapon 12 in the form of a burst of coded light signals.

The weapon 12 is used in conjunction with the TV set 14 to play the game in the TV mode in the following manner. The TV set 14 is tuned to a station broadcasting a program which includes portions of the video display which are coded in a unique fashion to designate an opponent firing at the player operating the weapon 12 and also to designate a vulnerable area on the video screen where the player may shoot at and score against the opponent. These two separate areas are designated in FIG. 1 as a hit area 68, and a score area 70, and are differentiated from each other by means of a unique modulation scheme.

In the preferred embodiment, the hit area 68 is designated by an area of light, the intensity of which is modulated in synchronism with the 60 HZ raster scan of the TV set 14 at a predetermined frequency. The frequency chosen for the hit area is 15 HZ and the modulation is accomplished by flashing the hit area at a relatively high luminous intensity for one field of the raster scan and then blanking the hit area for the following three fields of the raster scan. An alternative way of creating the 15 HZ signal is to flash the hit area for two fields of the raster scan, and then blank the area for the following two fields. This modulation of the area 68 is continued for a duration of about one to two seconds to provide several cycles of the 15 HZ intensity modulation. This is sufficient time to permit the photosensor 64 of the weapon 12 to detect the hit area when the weapon 12 is accurately pointed at the TV set 14.

The score area 70 is differentiated from the hit area 68 by modulating it at a different frequency. In the preferred embodiment, the score area 70 is modulated at a 30 HZ rate which is accomplished by flashing the area 70 at a relatively high luminous intensity for one field of the raster scan and then blanking the area for the subsequent field of the raster scan. This pattern is also repeated for about one to two seconds to provide several cycles of the 30 HZ intensity modulated signal so that the photosensor 64 can sense the score area 70 when the weapon 12 is accurately aimed at the TV set 14.

It will be appreciated that the low frequencies chosen for modulating the intensity of the areas 68 and 70 may produce a flickering on the screen of the TV set 14. However, the areas 68 and 70 are usually representing laser weapon blasts, rocket exhausts, and other such action where flicker is not objectionable and in fact enhances the realism of the scene being depicted.

The construction of the photosensor housing 62 in combination with the diffuser 66 provides a relatively narrow field of view for detecting the modulated light signals from the TV set 14. In a preferred embodiment, the typical size for the areas 68 and 70 is 40 mm × 40 mm square. The sensitivity of the photosensor 64 is sufficient to detect the modulated light signal in a range up to 10 feet from the set 14 when the weapon 12 is pointed within two degrees of axial alignment with the particular areas 68 and 70.

Game play is initiated when the specially coded TV program is tuned in on the set 14 and the player energizes the weapon 12 by placing the power switch 36 in the TV position. Note that the TV program may also be provided using a videotape and a video recorder in conjunction with the set 14. When power is first applied to the weapon 12, an electronic processor within the weapon 12 sets an initial score for the player of 5 points. This score may be verified by pressing the switch 38. The speaker 42 will beep five times.

As the action progresses on the video screen, the player points the weapon 12 at the screen in hopes of scoring against the opponents being displayed. If the weapon 12 is pointed at a hit area 68, the modulated light signal from the area 68 is detected by the photosensor 64 and the electronics within the weapon 12 records a hit against the player by generating a hit sound through the speaker 42 and by decrementing the score counter by one point.

The player may score against the TV opponent by aiming the weapon 12 at a score area 70. The player is notified that he is on target to score by the illumination of the LED 34 for approximately 0.2 seconds. In order to score against the TV opponent, the player must depress the trigger 26 during the time the LED 34 is lit. If this is accomplished, a score sound is generated from the speaker 42, and the score counter registers an increase of one point. At any time during the play of the game, the player may check his score by pressing the switch 38 and counting the number of beeps from the speaker 42.

Should the player receive sufficient hits so that the score reaches zero, the electronics within the weapon 12 energizes the motor 44 which causes the canopy 54 to open and the figure sitting in the ejection seat 56 to be ejected from the weapon 12. This ends the game for that particular player.

From the above description, it may be seen that the unique operation of the weapon 12 permits two-way interaction between the player and the video display. He may be hit by the video opponent and he may score against the video opponent. Additionally, several players, each armed with a weapon 12, may participate during the broadcast of the TV program to increase the excitement of the game play.

The weapon 12 has an additional feature to permit its use with a second player having a weapon 12 without the need for a video display. This is accomplished in the following manner. In order to play the game with two players and without the use of the TV set 14, each player sets the power switch on his respective weapon 12 to the combat position. In this position, when the trigger 26 is pressed on the weapon 12, the incandescent light bulb 60 is flashed at a 15 HZ rate to simulate the modulated light signal normally broadcast from the video screen as a hit area 68. One advantage of the 15 HZ frequency is that it is sufficiently low to enable the filament of an incandescent bulb to respond.

The players may score against each other by aiming their weapons and pressing the trigger 26 at an appropriate time. When the trigger is pulled, the lamp 60 is flashed for at least two seconds at the 15 HZ rate to allow sufficient time for the filament within the lamp to warm up to full intensity. The weapon 12 also generates a fire sound from the speaker 42. For a portion of the time in which the player is pressing the trigger 26 to fire against the opponent, the circuitry within the weapon 12 which responds to hits is disabled. As in the manner described above for the TV interaction game, when a player's score counter is reduced to zero, the canopy 54 opens and ejection seat 56 ejects the toy figure.

Figure 3:
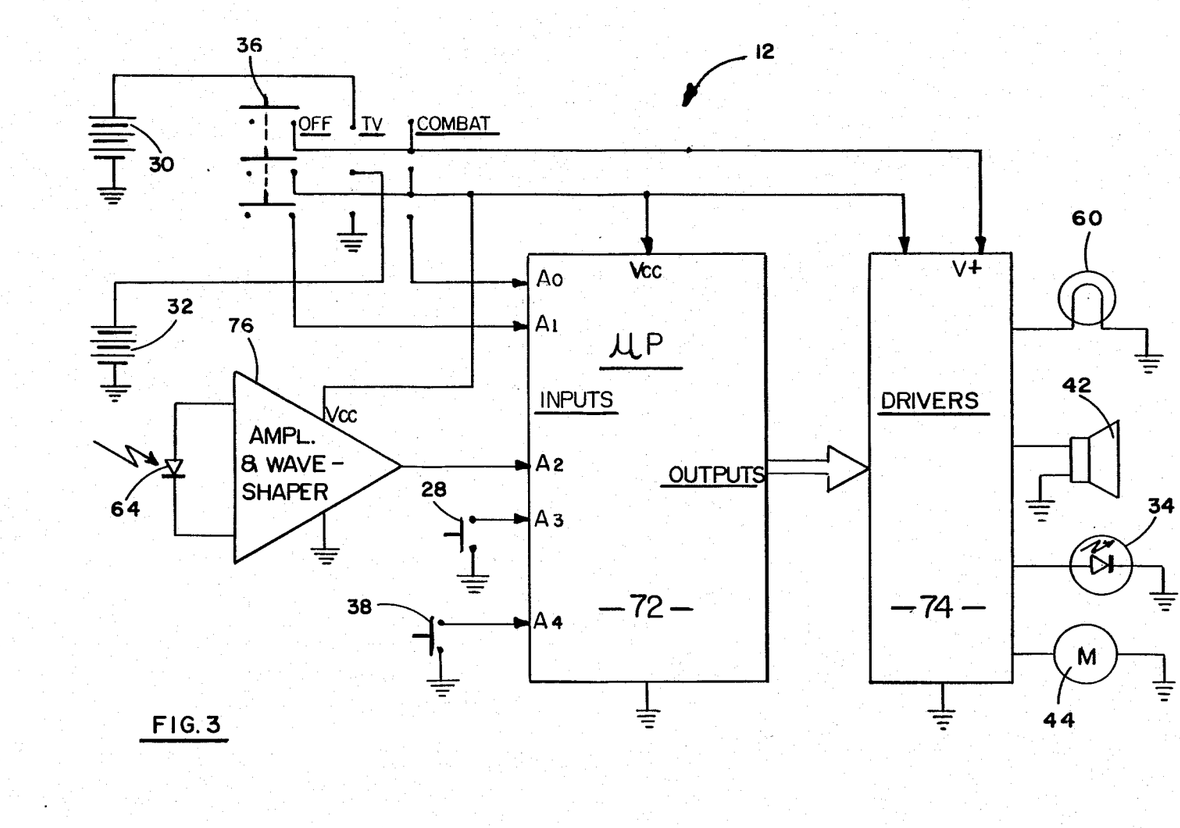
FIG. 3 is a schematic/block diagram of the circuitry used in the weapon of FIG. 2.

FIG. 3 is an illustration partially in schematic and partially in block diagram form of circuitry which may be utilized in the construction of the weapon 12. The circuitry includes a microprocessor 72 which may be, for example, an NEC type 7507 single chip microcontroller. Output signals from the processor 72 are provided to high power drivers 74 which in turn provide power from the batteries 30 and 32 to the various output devices, namely the LED 34, the speaker 42, the incandescent light bulb 60, and the motor 44. The power switch 36 is a three-position slide switch having an off, a TV, and a combat position. In both the TV and combat positions, power is supplied from the batteries 30 and 32 to power the processor 72, the output devices, and amplifier and wave shaper electronics 76 used to amplify and condition the signals received from the photosensor 64.

An output signal from the electronics 76 is provided to input terminal A2 of the processor 72. A trigger signal from the switch 28 is provided as an input signal at terminal A3 of the processor 72. A signal from the count switch 38 is provided as an input signal to the terminal A4 of the processor 72. The switch 36 also serves to provide a signal either to the input terminal A1 or the input terminal A0 of the processor 72 to designate whether the TV or combat mode of operation has been selected.

As is well known to those skilled in the art, a microprocessor includes all of the input, output, memory, logic, and control circuitry necessary to perform functions similar to a digital computer in miniature form. The processor 72 serves to perform all of the logic functions necessary for the operation of the weapon 12, including the score keeping function. Although, as described above, the score is indicated to the user by beeps from the speaker 42, it is contemplated that a numeric display such as an LED or a liquid crystal display may also be used to indicate the score to the user.

A variety of accessory items may be added to the game 10 to enhance the excitement of the game play. One such accessory is the photo sensitive light source 16 shown in detail in FIG. 4. The source 16 includes a plastic molded housing 78 which supports an incandescent light source 80 mounted to radiate light in a horizontal direction. The source 80 is mounted within several transparent plastic rings 82 which become illuminated when the source 80 is lit and act to broaden the beam of light transmitted by the source 80.

Figures 4, 6, 7:
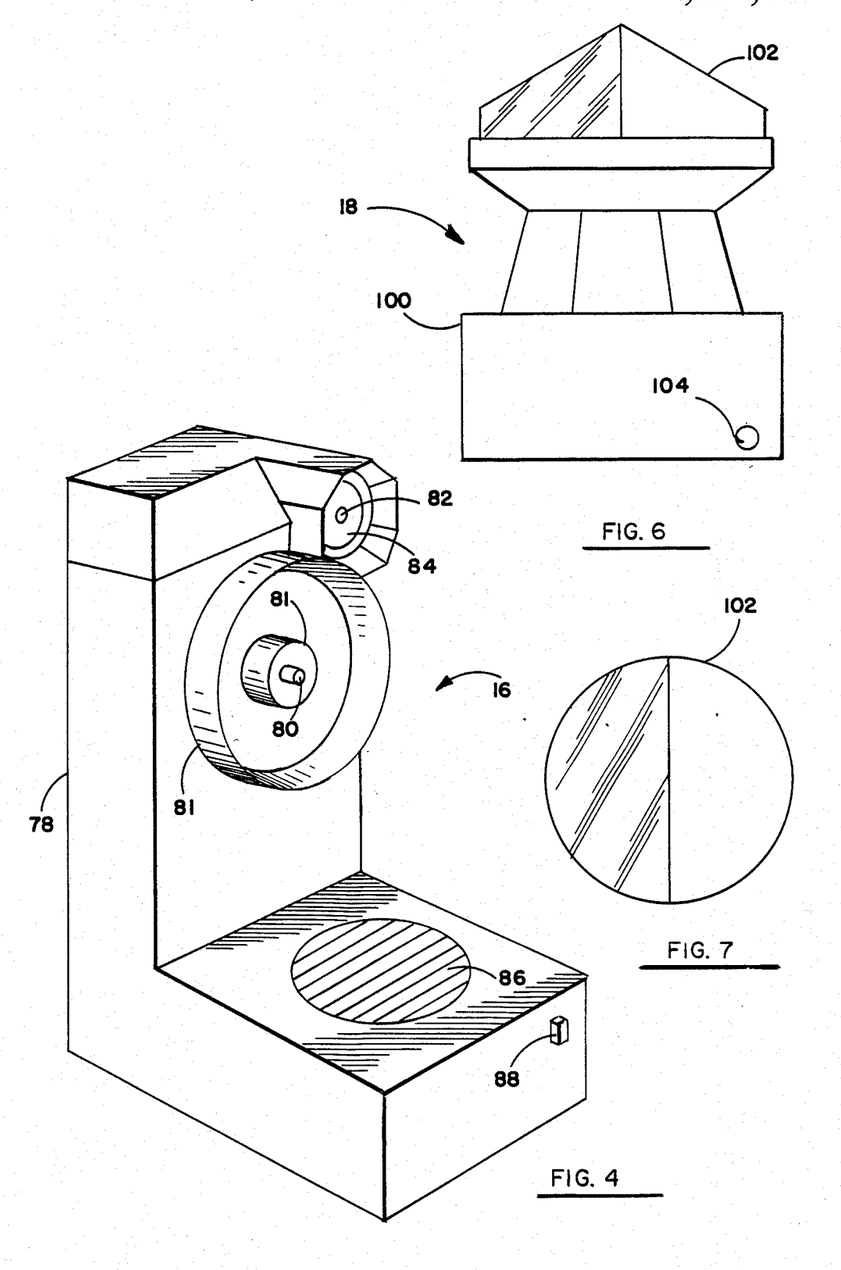
FIG. 4 is a perspective view of a photosensitive light source which is one of the interactive game elements shown in FIG. 1.
FIG. 6 is a side view of a rotating mirror which is one of the interactive game elements shown in FIG. 1.
FIG. 7 is a top view of the rotating mirror of FIG. 6.

The housing 78 also mounts a photosensor 82 located behind a diffuser 84. Also mounted within the housing 78 is a speaker 86 for generating various sounds and a power switch 88 for applying power to the source 16 from batteries (not shown) located within the housing 78.

The operation of the photosensitive light source 16 is as follows. During the play of the game 10, the source 16 is positioned to receive light both from the TV set 14 and the weapons 12, as shown in FIG. 1. The photosensor 82 is capable of detecting, over a relatively wide field of view, the 15 HZ hit signals generated either from the hit area 68 of the video screen or from the incandescent lamps 60 in the weapons 12 when they are set in the combat mode. When the source 16 is energized, the photosensor is set to detect 15 HZ hit signals. Upon such an occurrence, the incandescent bulb 80 is energized in a particular fashion.

First, the incandescent source 80 is modulated at a 15 HZ rate for a 15 second interval, thus providing hit signals which radiate over a wide angle as a result of the rings 82. At the completion of the 15 second interval, the source 16 generates a 30 HZ light signal for 15 seconds.

Accordingly, the source 16, upon receipt of a hit signal, regenerates a hit signal followed by a score signal. It will be apparent that the source 16 becomes an additional opponent which may score against the players and upon which the players may score. The speaker 86 emits tones of different frequencies during the transmission of the 15 HZ and 30 HZ light bursts so that the players may distinguish which signals are being transmitted.

Figure 5:
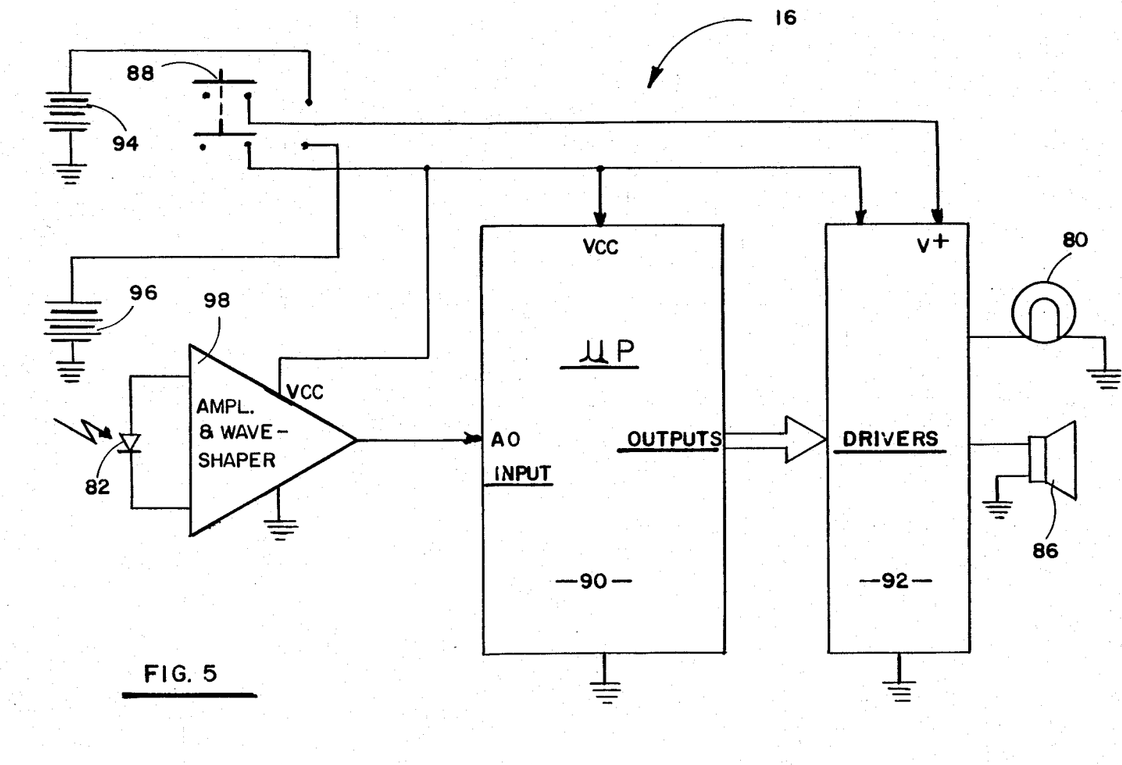
FIG. 5 is a schematic/block diagram of the circuitry used in the photosensitive light source of FIG. 4.

FIG. 5 is an illustration partially in schematic and partially in block diagram form of circuitry which may be utilized in constructing the photosensitive light source 16. The circuitry includes a microprocessor 90 which may be similar to the microprocessor 72 used in the weapon 12. Output signals from the processor 90 are provided to drivers 92 which provide power from batteries 94 and 96 to the output devices which are the incandescent lamp 80 and the speaker 86.

The power switch 88 provides power from the batteries 94 and 96 to the processor 90, the drivers 92, and amplifier and wave shaper electronics 98 which amplify and condition the signal from the photosensor 82. An output signal from the electronics 98 is provided to input terminal A0 of the processor 90, which performs all of the logic and timing functions necessary for the operation of the photsensitive light source 16.

Another accessory which may be used in the play of the game 10 is the rotating mirror 18 shown in detail in FIGS. 6 and 7. The mirror 18 consists of a plastic base 100 containing batteries and a motor used to rotate a conical reflector 102 about a vertical axis. As shown in the top view of FIG. 7, the reflector 102 has half of its surface covered with a reflective material while the other half of the surface is coated black. A power switch 88 and speed control 104 is provided to adjust the speed of rotation of the reflector 102. The rotating mirror 18 is used in conjunction with a light source such as a table lamp 20 to reflect light from that light source into the play area. By the proper setting of the speed control 104, the reflector 102 may be caused to rotate at either a 15 HZ or a 30 HZ rate, thereby producing either the hit signal or the score signal from the light produced by the lamp 20.

A convenient way to set the rotation speed of the reflector to 15 HZ is to aim a weapon 12 at the mirror 18 and adjust the speed control 104 until the weapon 12 registers a hit. The weapon 12 may also be used to assist in adjusting the speed of the reflector 102 to 30 HZ by pointing the weapon 12 at the reflector 102 and adjusting the control 104 until the target LED 34 switches on, indicating that a score has been detected.

It will be appreciated that the accessories 16 and 18 described above substantially enhance the excitement of the game because they represent additional opponents. It is interesting to note that a flat mirror may also be used in conjunction with one of the weapons 12. By properly aiming the weapon 12 at the mirror and pressing the trigger in the combat mode, the 15 HZ hit signal will be reflected from the mirror back to the weapon, which may then register a hit.

Figure 9:
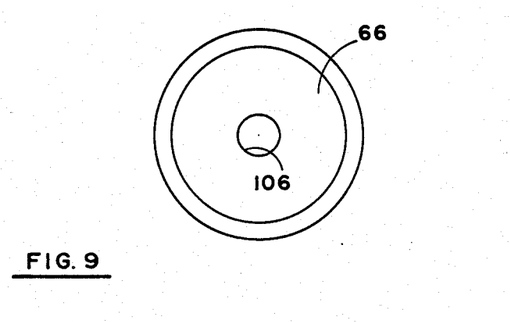
FIG. 9 is a front view of a diffuser used in the housing of FIG. 8 for the light source shown in FIG. 4.
Figure 10:
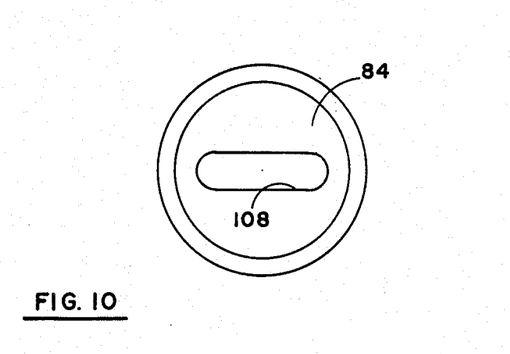
FIG. 10 is a front view of a diffuser used in the housing of FIG. 8 for the light source shown in FIG. 4.

In the construction of the weapon 12 and the photosensitive light source 16, it was found necessary to devise a photosensor assembly capable of receiving the relatively low intensity light from a television screen as well as the higher intensity incandescent light from another weapon 12 or from the light source 16 or rotating mirror 18. This is accomplished in the present invention by the use of a unique diffuser as shown in FIGS. 8, 9 and 10.

Figure 8:
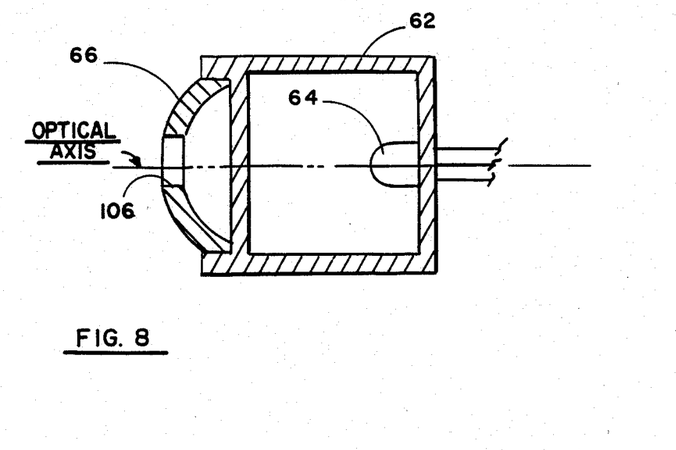
FIG. 8 is a cross-sectional view of a photosensor housing employed in the weapon of FIG. 2 and the light source of FIG. 4.

FIG. 8 is a cross-sectional view of the photosensor assembly 62 used in the weapon 12. It is also indicative of the photosensor assembly used in the light source 16. The assembly includes a housing which mounts the photosensor 64. The housing is closed by a diffuser 66. The diffuser 66 is generally hemispherical in shape and has a central circular aperture 106 which is aligned with the optical axis of the photosensor 64.

In operation, the aperture 106 provides a direct path to the photosensor 64 for the low intensity light signals from the TV set 14 when these light signals are aligned within a few degrees of the axis of the sensor 64 without suffering from the attenuating effects of the diffuser 66. At the same time, the diffuser 66 permits wide angle reception of the higher irtensity incandescent light signals generated by other weapons 12 or the accessories 16 and 18.

The construction of the assembly 62 is substantially identical in the photosensitive light source 16 except for the shape of the aperture 106. In the case of the light source 16, the diffuser 84 contains an oblong aperture 108 as shown in FIG. 10 as opposed to the circular aperture 106 used for the diffuser 66 in the weapon 12. The larger aperture 108 provides a larger field of view for the source 16 when responding to signals from the TV set 14.

Figure 11:
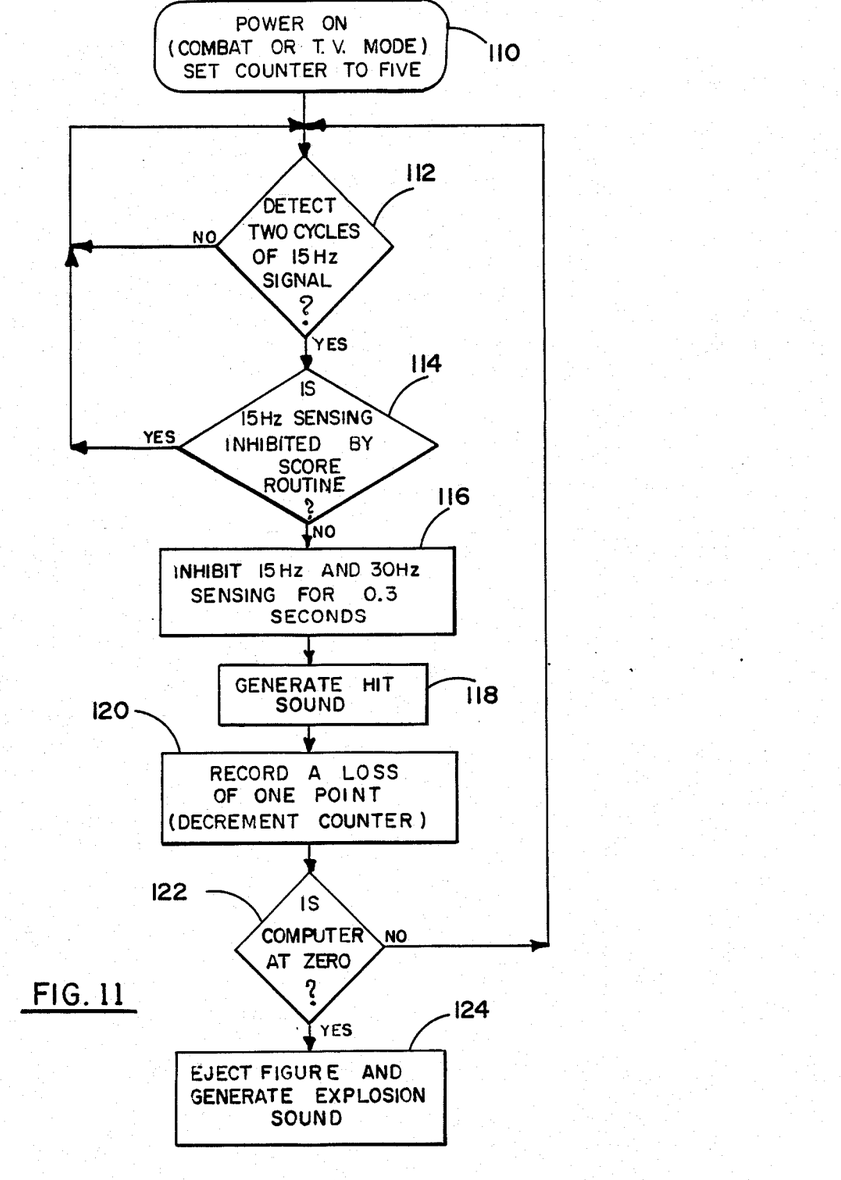
FIG. 11 is a flow chart showing the logical sequence of operation of the weapon of FIG. 2 when it receives a hit from an opponent in either the TV or combat mode of operation.

FIG. 11 is a flow chart describing the operation of the microprocessor 72 in the weapon 12 when that weapon is responsive to hit from an opponent in the form of a burst of light whose intensity is modulated at 15 HZ. The routine described by the flow chart in FIG. 11 is entered at step 110 when the power switch is moved to either the combat or TV mode of operation. The score counter within the processor 72 is initialized to five points.

The program moves from step 110 to step 112 where the processor 72 determines whether at least two cycles of the 15 HZ light signal have been detected by the photosensor 64. If such detection has not taken place, the processor 72 continues monitoring the photosensor 64 until a hit is detected. At that point, the program moves to step 114 to determine if the 15 HZ sensing for this weapon has been inhibited by the score routine to be described below. If the sensing is inhibited, the program returns to step 112 and continues monitoring the sensor 64 for future hit detection.

If the 15 HZ sensing has not been inhibited, the program moves to step 116 where both 15 HZ and 30 HZ sensing is inhibited for 0.3 seconds. In other words, the weapon 12 will not respond to any additional 15 HZ or 30 HZ light signals for 0.3 seconds. The program moves to step 118 where a hit sound is generated in the speaker 42. The program then moves to step 120 where a one point loss is recorded by decrementing the counter previously set to 5 points.

The program then moves to step 122 to determine if the counter is at zero. If it is not, the program returns to step 112 to monitor the sensor 64. If the counter is at zero, the program moves from step 122 to 124 and energizes the motor 44 to cause the figure, canopy, and ejection seat to eject from the weapon 12. At the same time, an explosion sound is generated by the speaker 42.

Figure 12A:
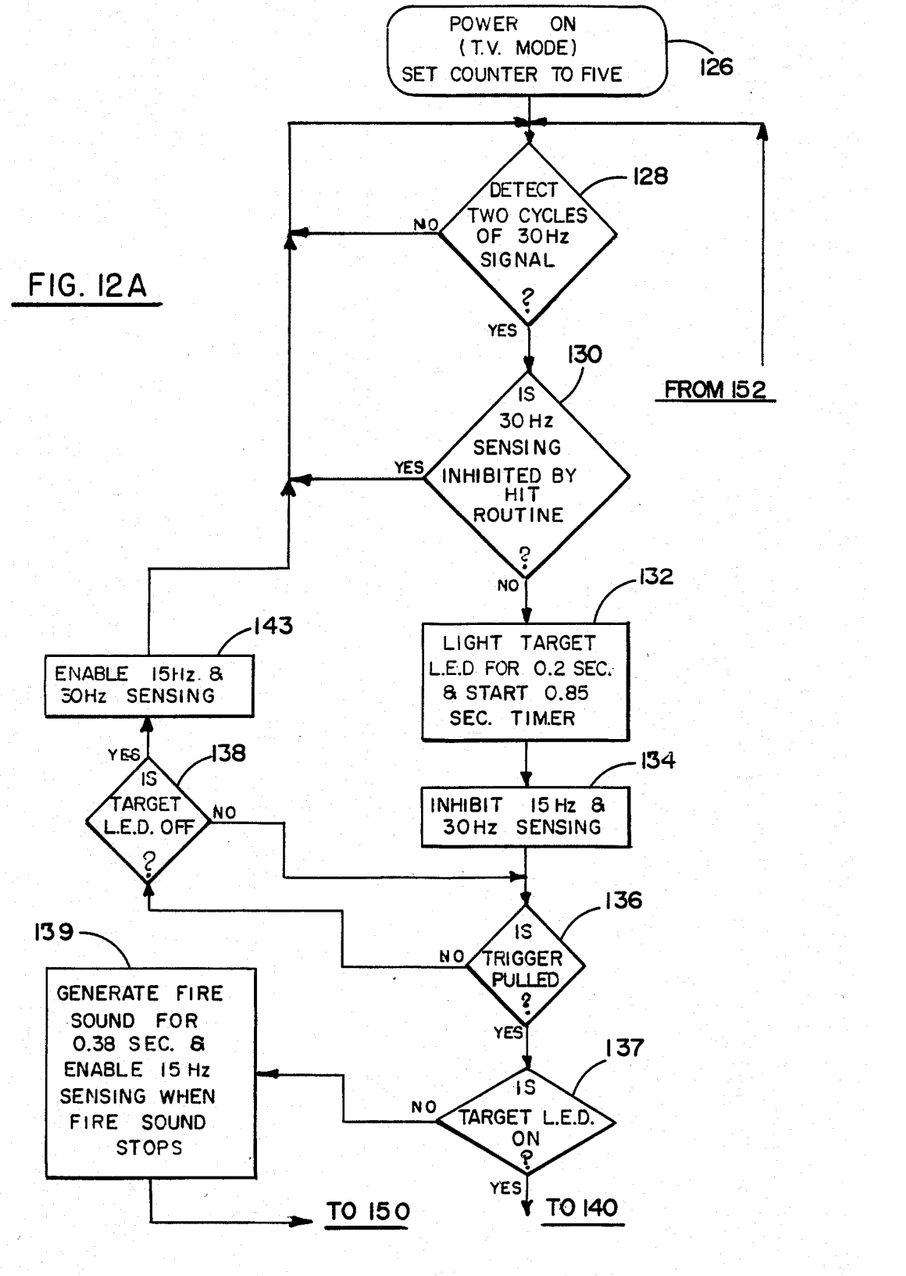
FIG. 12 is a flow chart showing the logical sequence of operation of the weapon of FIG. 2 when it scores a hit against an opponent in the TV mode of operation.
Figure 12B:
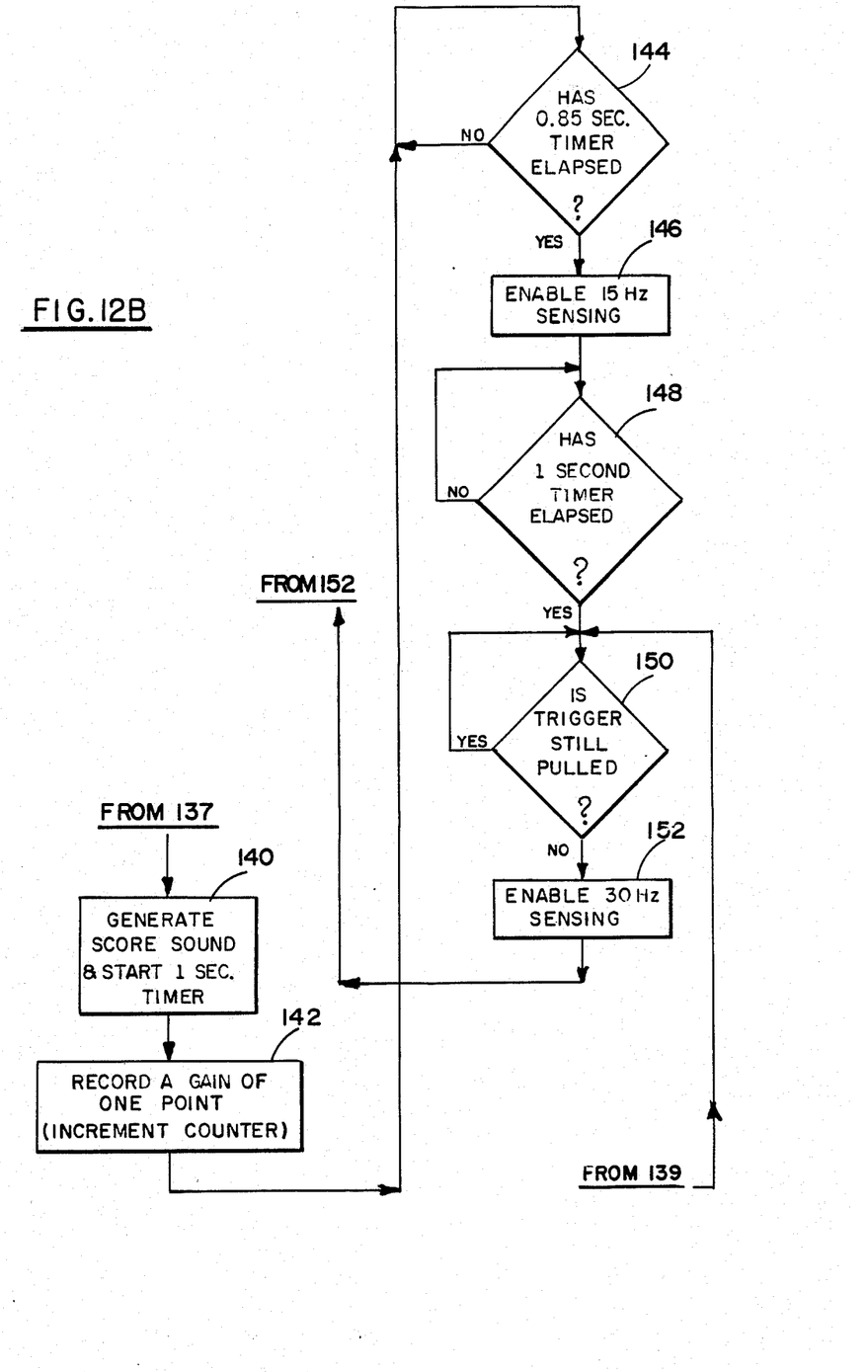

FIG. 12 is a flow chart showing the operation of the processor 72 when the weapon 12 is in the TV mode and the sensor 64 is responsive to a score signal in the form of a 30 HZ burst f light. The program is entered when the power switch is turned on to the TV mode, at which time the score counter is initialized to 5 points. The program moves from step 126 to step 128 to determine whether two cycles of the 30 HZ light signal have been detected. If not, the program cycles back to step 128 and continues to monitor the photosensor 64.

If the two cycles of 30 HZ light have been detected, the program moves to step 130 where it is determined whether 30 HZ sensing has been previously inhibited by the hit routine described with respect to FIG. 11. If 30 HZ sensing has been inhibited, the program returns to step 128 and continues to monitor the sensor 64 for subsequent 30 HZ light signal reception.

If 30 HZ sensing has not been inhibited, the program moves from step 130 to step 132. At step 132, the LED 34 is illuminated for 0.2 seconds and a 0.85 second timer is started. The illumination of the LED 34 is a signal to the player that he must press the trigger before the LED extinguishes in order to score a hit against the opponent. The program moves from step 132 to step 134 where 15 HZ and 30 HZ sensing is inhibited, thus preventing the weapon 12 from responding to subsequent light signals.

The program moves to step 136 to determine if the trigger 26 has been pulled. If the trigger has not been pulled, the program moves to step 138 to determine whether the target light 34 has been turned off. If it has not, the program recycles to step 136 to monitor the status of the trigger. If the LED 34 is extinguished, the program moves from step 138 to step 140 where 15 HZ and 30 HZ sensing is reenabled. The program then moves back to step 128 to monitor the sensor 64 for future detection of light signals.

Returning to step 136, if the trigger has been pulled by the player, the program moves to step 138 to determine whether the LED 34 is still illuminated. If the LED is still illuminated, the program moves to step 140 to generate a score sound in the speaker 42 and to start a one second timer. The program then moves to step 142 to record a gain of one point by incrementing the score counter.

The program then moves to step 144 to determine whether the 0.85 second timer has elapsed. If it has not, the program recycles at step 144 to reinterrogate the timer until it does elapse. At that time, the program moves to step 146 to reenable the sensing of 15 HZ light signals and then moves to step 148 to determine whether the one second timer has elapsed. If it has not, the program reinterrogates the timer until it does elapse. At that time, the program moves to step 150 to see if the trigger is still being pulled. If it is, the program recycles at step 150 and continues to interrogate the signal from the trigger switch 28 until the trigger is released. At that time, the program moves to step 152 and enables the sensing of 30 HZ light signals. The program then returns to step 128 to monitor the future reception of coded light signals by the sensor 64.

Returning to step 138, if the program determines at step 136 that the trigger has been pulled but the target LED is not on, thereby indicating that the player was not fast enough to record a score against the opponent, the program moves from step 138 to step 140. At step 140, a fire sound is generated by the speaker 42 for 0.38 seconds. At the completion of the fire sound, the 15 HZ sensing is reenabled. The program then moves to step 150 to determine if the trigger is still being pulled, and cycles at that step until the trigger is released. When the trigger is released, the program moves to step 152 to enable the 30 HZ sensing and then returns to step 128 to monitor the sensor 64 for subsequent reception of coded light signals.

From the above description, it will be seen that logic is included in the processor 72 to reenable the detection of 15 HZ sensing before the LED target light is extinguished and before the player has had a chance to release the trigger. This feature increases the excitement of the game since a player may be hit even while he is recording a score against the opponent. At the same time, the logic precludes the player from recording a second score against the opponent until he has released the trigger.

Figure 13:
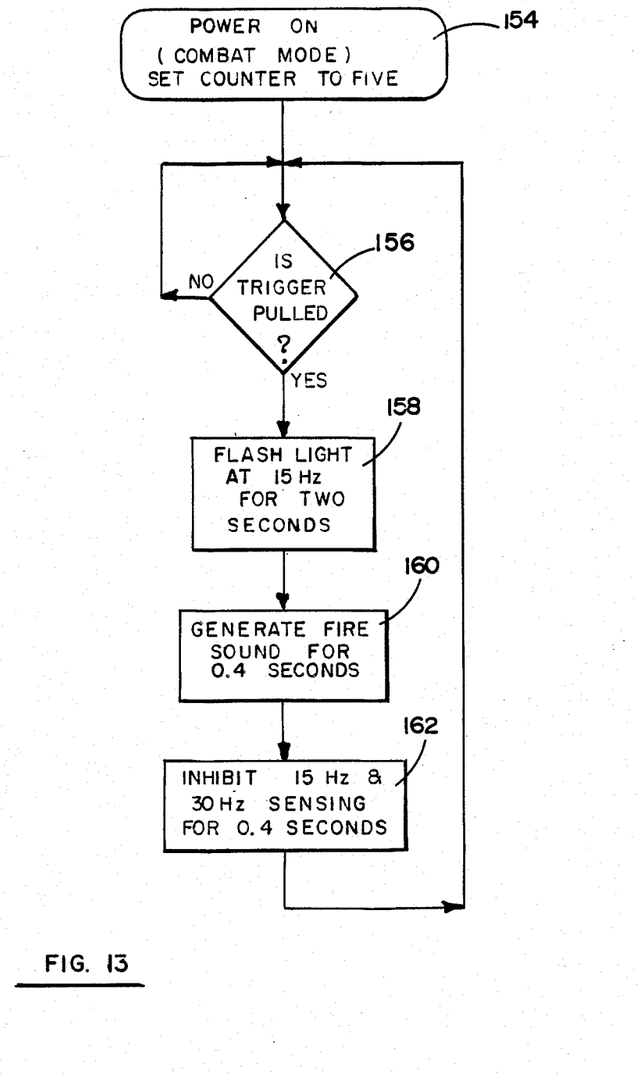
FIG. 13 is a flow chart showing the logical sequence of operation of the weapon of FIG. 2 when it fires at an opponent in the Combat mode of operation.

FIG. 13 is a flow chart depicting the operation of the processor 72 when the weapon 12 is in the combat mode and is firing against an opponent. The program is entered at step 154 with the power switch set to the combat mode which initiates the score counter to five points. The program then moves to step 156 where it is determined whether the trigger is being pulled. If it is not, the program recycles at step 156 to continue interrogating the trigger signal.

When the trigger is pulled, the program moves to step 158 where the incandescent light bulb 60 is flashed at a 15 HZ rate for two seconds. At the same time, a fire sound is generated at step 160 for 0.4 seconds and at step 162 both 15 HZ and 30 HZ sensing are inhibited for 0.4 seconds. The program then returns to step 156 to monitor the status of the trigger for subsequent firing.

Note that by limiting the sound generation and light sensing inhibit to a time that is less than the two seconds of signal generation enhances the excitement of the game since the opponent cannot tell the exact time at which the 15 HZ signal is terminated, and he remains vulnerable as long as the light 60 remains flashing at the 15 HZ rate. Similarly, when the 15 HZ and 30 HZ sensing is no longer inhibited, the player firing at his opponent becomes vulnerable to be hit by other opponents.

Figure 14:
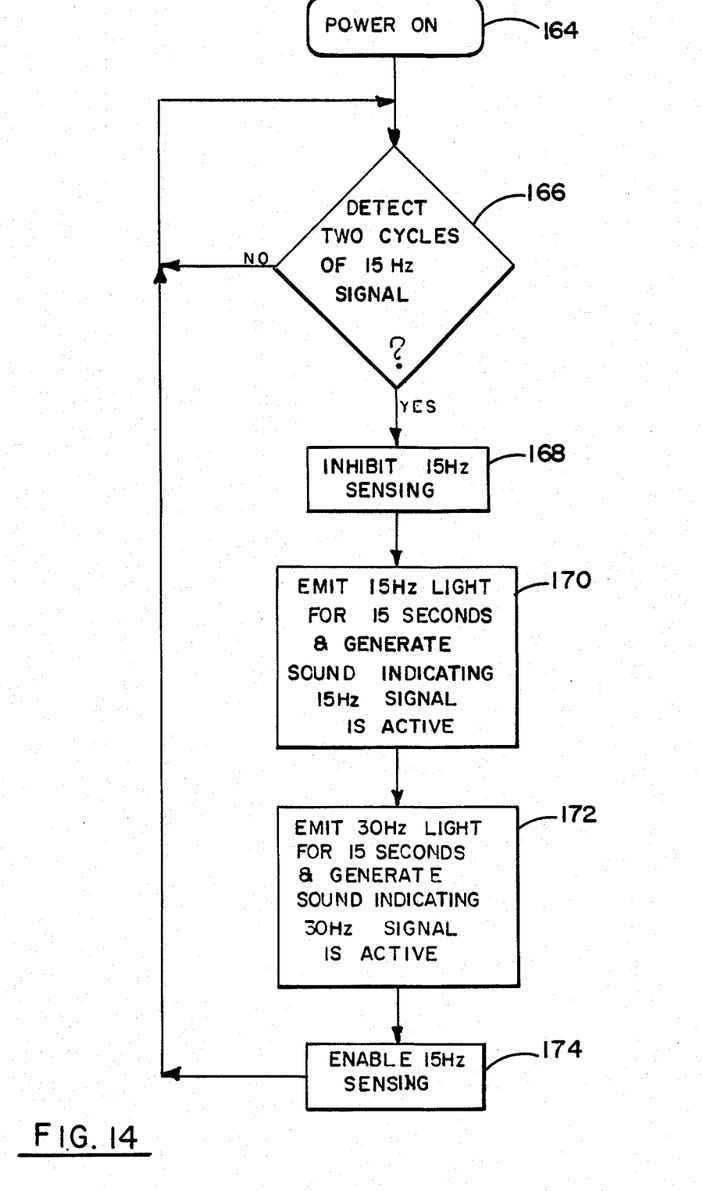
FIG. 14 is a flow chart showing the logical sequence of operation of the light source of FIG. 4.

FIG. 14 is a flow chart depicting the operation of the microprocessor 90 in the photosensitive light source 16. The program is entered at step 164 when power is turned on by switch 88. The program then moves to step 166 to detect whether at least two cycles of the 15 HZ hit signal have been detected. If not, the program recycles at step 166 and monitors the sensor 82 until a hit detection is sensed. Upon that occurrence, the program moves to step 168 where further 15 HZ sensing is inhibited.

The program then moves to step 170 where the incandescent lamp 80 is pulsed at a 15 HZ rate for 15 seconds. At the same time, a sound is generated by speaker 86 indicating that the 15 HZ hit signal is active. At the completion of the 15 seconds, the program moves to step 172 where the incandescent lamp 80 is pulsed at a 30 HZ rate for a period of 15 seconds and a different sound is generated by the speaker 86 to indicate that the 30 HZ score signal is active. At the completion of this 15 seconds, the program moves to step 174 where 15

HZ sensing is reenabled and then the program returns to step 166 to monitor the sensor 82 for subsequent detection of 15 HZ signals.

In the above description of the operation of the interactive game apparatus 10, several game play options have been described. The apparatus 10 is by no means limited to these game play options, and additional modes of operation are limited only by the imagination of the players. For example, while two players may have their weapons in the TV mode and may be interacting with the video display on the TV set 14, one of the players may switch his weapon to the combat mode and turn upon the other player in an effort to decrease the other player's score. Similarly, either player may switch to the combat mode and fire upon the photosensitive light source 16 causing it to generate both hit and score signals.

As will be apparent to the reader, the novel game play apparatus of the present invention provides a versatile and exciting combination of game play options which permit interaction of one or more players with a video presentation, permits interaction between two or more players, and permits a player to play by himself with or without a video display.

As will be understood by those skilled in the art, many different programs may be used to implement the flow charts disclosed in this specification. Obviously, those programs will vary from one another in different degrees. However, it is well within the skill of the art of the computer programmer to provide particular programs for implementing each of the steps of the flow charts disclosed herein. It is also to be understood that various microcomputer circuits might be programmed for implementing each of the steps of the flow charts disclosed herein without departing from the teaching of the invention. It is thus intended that the invention be limited only by the scope of the claims appended hereto.

We claim:

1. Interactive game apparatus, comprising:
   a first photosensitive device having a photosensitive area which may be claimed by a player at a light source;
   detecting means for detecting light rays transmitted in the form of a burst of first coded light signals, for providing a first detector signal when said first coded light signals impinge on the photosensitive area, for detecting light rays transmitted in the form of a burst of second coded light signals and for providing a second detector signal when said second coded light signals impinge on the photosensitive area;
   trigger means actuated by the player to provide a trigger signal;
   player signal means for providing a player signal discernable by the player when the second detector signal is provided; and
   control means responsive to said detecting means, trigger means and player signal means, and including timer means for determining the time interval between the occurrence of the player signal and the trigger signal;
   and counter means for counting each occurrence of the first detector signal and for counting each occurrence of the second detector signal for those occurrences where the interval of time between the player signal and the trigger signal is within a predetermined interval of time.

2. The game apparatus of claim 1 where the counter means increments a counter for each counted occurrence of the second detector signal, and decrements said counter for each counted occurrence of the first detector signal.

3. The game apparatus of claim 2 further including an ejectable object attached to the first photosensitive device, and means for ejecting the object from the device when the counter reaches a predetermined count.

4. The game apparatus of claim 1 in which the first and second coded light signals are generated by a video screen.

5. The game apparatus of claim 1 in which the first coded light signal is a burst of light whose intensity is modulated at a first freuency, and in which the second coded light signal is a burst of light modulated at a second frequency.

6. The game apparatus of claim 5 further including reflector means for reflecting a beam of light from a continuous light source, and means for interrupting the reflected beam of light at a predetermined interruption frequency.

7. The game apparatus of claim 6 in which the interrupting frequency may be set to either the first of the second frequency.

8. The game apparatus of claim 1 in which the first and second coded light signals are generated by a television screen, and in which the first and second frequencies are synchronized to the television raster scan frequency.

9. The game apparatus of claim 1 in which the first and second frequencies are 15 HZ and 30 HZ, respectively.

10. The game apparatus of claim 1 in which the first photosensitive device further includes a first light which provides the burst of first coded light signals upon actuation of the trigger means.

11. The game apparatus of claim 10 in which the first coded light signal is a burst of light whose intensity is modulated at a 15 HZ frequency, and where the first light source is an incandescent lamp.

12. The game apparatus of claim 10 further including a second photosensitive device having a second photosensitive area which may be aimed by a second player at a light source;
   second detecting means for detecting light rays transmitted in the form of a burst of the first coded light signals, for providing a third detector signal when said first coded light signals impinge on the second photosensitive area, for detecting light rays transmitted in the form of a burst of the second coded light signals and for providing a fourth detector signal when said second coded light signals impinge on the second photosensitive area;
   second trigger means actuated by the player to provide a second trigger signal;
   second player signal means for providing a second player signal discernable by the second player when the fourth detector signal is provided;
   second control means responsive to said second detecting means, second trigger means and second player signal means, and including second timer means for determining the time interval between the occurrence of the second player signal and the second trigger signal; and
   second counter means for counting each occurrence of the third detector signal and for counting each occurrence of the fourth detector signal for those occurrences where the interval of time between the second player signal and the second trigger signal is within a second predetermined interval of time; and a second light source which provides the burst of first coded light signals upon actuation of the second trigger means, whereby the first and second players may aim their respective photosensitive devices at each other to engage in an interactive game.

13. The game apparatus of claim 1 further including a photosensitive light source having a third photosensitive area;

third detecting means for detecting light rays transmitted in the form of a burst of first coded light signals and for providing a fifth detector signal when said first coded light signals impinge on the photosensitive area;

light source means for providing light rays; and control means responsive to the third detecting means for modulating the light source means to provide the burst of first coded light signals for a second predetermined interval of time and to provide the burst of second coded light signals for a third predetermined interval of time.

14. The game apparatus of claim 1 in which the photosensitive area includes a photosensor covered by a generally hemispherical light diffuser to direct off-axis light to the photosensor, where the center of said diffuser is provided with an opening substantially axially aligned with the photosensor axis to provide an axial path for light to impinge on the photosensor by bypassing the diffuser.

15. A photosensitive light source having a photosensitive area; detecting means for detecting externally generated light rays transmitted in the form of first coded light signals and for providing a detector signal when said externally generated first coded light signals impinge on the photsensitive area;

light source means for providing light rays; and control means responsive to the detector signal for modulating the light source means to provide a first light output signal in the form of a burst of coded light.

16. The device of claim 15 in which the burst of light of the first light output signal is coded the same as the first coded light signals.

17. The device of claim 16 in which the burst of light of the first light output signal occurs for a first predetermined interval of time.

18. The device of claim 17 in which the control means further modulates the light source to provide a second light output signal in the form of a burst of light coded differently from that of the coded light in the first light output signal.

19. The device of claim 18 in which the burst of light of the second light output signal occurs for a second predetermined interval of time.

* * * * *